(12) United States Patent
Arndt et al.

(10) Patent No.: US 10,228,010 B2
(45) Date of Patent: Mar. 12, 2019

(54) INSTALLATION HOLDING ELEMENT HAVING A PLURALITY OF CLOSURE ELEMENTS

(71) Applicant: BÖLLHOFF VERBINDUNGSTECHNIK GmbH, Bielefeld (DE)

(72) Inventors: Andreas Arndt, Kalletal (DE); Maximilian Betz, Mindelstetten (DE); André Röhr, Herford-Elverdissen (DE); Daniel Tovar Escolar, Bielefeld (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 83 days.

(21) Appl. No.: 15/380,294

(22) Filed: Dec. 15, 2016

(65) Prior Publication Data

US 2017/0175798 A1    Jun. 22, 2017

(30) Foreign Application Priority Data

Dec. 17, 2015  (DE) .................. 10 2015 122 097

(51) Int. Cl.
  *F16B 35/06*    (2006.01)
  *F16B 41/00*    (2006.01)
  (Continued)

(52) U.S. Cl.
  CPC .......... *F16B 41/005* (2013.01); *B25B 27/14* (2013.01); *B25G 1/10* (2013.01); *F16B 35/06* (2013.01); *F16B 37/14* (2013.01)

(58) Field of Classification Search
  CPC .. F16B 23/00; F16B 23/0007; F16B 23/0061; F16B 23/0069; F16B 23/0076;
  (Continued)

(56) References Cited

U.S. PATENT DOCUMENTS

| 294,524 | A | * | 3/1884 | Stiemke | .................. F16B 37/14 411/374 |
| 2,244,046 | A | * | 6/1941 | Bradshaw | ................ A47G 3/00 411/403 |

(Continued)

FOREIGN PATENT DOCUMENTS

| CH | 409532 A | 3/1966 |
| CN | 1101703 A | 4/1995 |

(Continued)

OTHER PUBLICATIONS

EP Extended Search Report EP Application No. 16204122.2 dated Mar. 29, 2017 (6 pages).

(Continued)

*Primary Examiner* — Roberta S Delisle
(74) *Attorney, Agent, or Firm* — Reising Ethington P.C.

(57) ABSTRACT

The present disclosure relates to a closure element of a drive means opening of a connection element. Further, the present disclosure relates to an installation holding element with a plurality of closure elements of the drive means opening of a connection element, wherein the closure elements can be installed manually without tool in the drive means opening of the connection element. For this purpose, the installation holding element comprises a holding element, a handle portion as well as a plurality of closure elements arranged at the holding element.

20 Claims, 7 Drawing Sheets

(51) Int. Cl.
　　　*B25B 27/14*　　　(2006.01)
　　　*B25G 1/10*　　　(2006.01)
　　　*F16B 37/14*　　　(2006.01)

(58) Field of Classification Search
　　　CPC .......... F16B 31/02; F16B 35/06; F16B 37/14;
　　　　　　　　　　　　　　F16B 41/005; A47G 3/00
　　　USPC ................................. 411/373, 402, 403, 408
　　　See application file for complete search history.

(56) References Cited

U.S. PATENT DOCUMENTS

| | | | | |
|---|---|---|---|---|
| 2,363,665 | A * | 11/1944 | George | A47G 3/00 |
| | | | | 411/373 |
| 3,065,662 | A | 11/1962 | Spoehr | |
| 3,078,754 | A * | 2/1963 | De Lacy | F16B 23/00 |
| | | | | 29/432 |
| 3,498,173 | A * | 3/1970 | Wright | F16B 23/0076 |
| | | | | 411/403 |
| 5,391,028 | A * | 2/1995 | Charles | F16B 37/145 |
| | | | | 244/1 A |
| 5,449,260 | A | 9/1995 | Whittle | |
| 5,603,472 | A * | 2/1997 | Hutter | B64C 1/12 |
| | | | | 244/132 |
| 6,302,630 | B1 | 10/2001 | Grant | |
| 6,634,842 | B2 | 10/2003 | Ueno | |
| 7,415,888 | B2 * | 8/2008 | Marczynski | B60B 3/145 |
| | | | | 73/761 |
| 9,086,085 | B2 * | 7/2015 | Lubchansky | F16B 23/0007 |
| 2007/0041807 | A1 * | 2/2007 | Gouda | A47G 3/00 |
| | | | | 411/373 |
| 2008/0014042 | A1 | 1/2008 | De France | |
| 2008/0025815 | A1 * | 1/2008 | Lubchansky | F16B 23/0007 |
| | | | | 411/372.5 |
| 2010/0151727 | A1 | 6/2010 | Luo et al. | |

FOREIGN PATENT DOCUMENTS

| | | |
|---|---|---|
| CN | 1405460 A | 3/2003 |
| CN | 101490428 A | 7/2009 |
| CN | 201326635 Y | 10/2009 |
| CN | 101752753 A | 6/2010 |
| CN | 202251331 U | 5/2012 |
| DE | 3509587 A1 | 3/1986 |
| DE | 69302251 T2 | 12/1996 |
| DE | 10240325 A1 | 4/2003 |
| DE | 20205314 U1 | 5/2003 |
| DE | 202010001752 U1 | 7/2010 |
| GB | 2403522 A | 1/2005 |
| JP | S6144014 U | 3/1986 |

OTHER PUBLICATIONS

CN Office Action for CN Application No. 201611169824.7 dated Jul. 10, 2018 (11 pages).

* cited by examiner

INSTALLATION HOLDING ELEMENT HAVING A PLURALITY OF CLOSURE ELEMENTS

1. CROSS REFERENCE TO RELATED APPLICATIONS

This application claims priority to German Patent Application No.: DE 10 2015 122 097.0 filed Dec. 17, 2015. The content of this priority application is incorporated herein by reference in its entirety.

2. TECHNICAL FIELD

The present disclosure is related to a closure element for a drive means opening of a connection element, an installation holding element for a plurality of closure elements, an installation method for the closure element of a drive means opening as well as a production method for the installation holding element having a plurality of closure elements and a connection element having a closure element installed therein.

3. BACKGROUND

In the prior art, different connection elements are known which are introduced into a component by means of a rotating movement of the connection element. The rotating movement provided with the aid of a tool is transmitted to a drive means opening of the connection element by means of a driving element of the tool, for example a bit. For this purpose, the drive means opening has approximately the complementary shape to the outer design of the drive means of the tool. To these tool shapes belong Phillips or crosshead, slotted or Torx drive means to name here just a few examples. These shapes are specified in corresponding standards, as for example DIN standards. Further, there exist company-specific drive means which also cooperate with the inner contour of a drive means opening.

Often, there exists an interest to secure connection elements which have been introduced into a component against an unauthorized or unrecognized loosening. To this end, the respective drive means opening of the connection element is closed with the aid of a respective closure element such that a quick loosening of the connection element via the drive means opening is at least made difficult if not completely prevented.

According to CH 409 532, the complete head of a slotted screw is surrounded by a closed seal. In this solution, the seal does not serve solely for the closure of the drive means opening but prevents the complete access to the screw head. GB 2 403 522 A describes screws having a hexagon bore or a slot as drive means opening. It is characteristic for these drive means openings that these drive means openings increase in size in installation direction of the respective connection element, in this case in the screw-in direction of the respective screw. For preventing the loosening of the connection element, an embedding material is driven into the drive means opening after installation of the connection element. Among these embedding materials are, for example, soft iron, lead, copper, zinc, aluminum, tin or similar materials. Due to the driving force of the striking tool, the embedding material is suppressed into the increasing or widening portion of the drive means opening so that it thus forms an undercut against the loosening of the embedding material from the drive means opening. With respect to the material to be used as well as the effort upon driving and suppressing the embedding material into the drive means opening, this installation method is relatively costly.

In DE 35 09 587 A1, a drive means opening of the safety screw is closed by the driving in of a ball, a fitting piece or by introducing an adhesive. For further securing the closure of the drive means opening in this context, the fitting piece consists of hardened steel. This material choice prevents that the fitting piece is drilled out with the aid of a drilling machine. Further, this fitting piece is used in combination with a surface roughness or toothing which is inclined against the insertion direction to fasten the fitting piece in the drive means opening in a secure manner. This toothing increases on the one side the press fit of the fitting piece in the drive means opening but increases on the other side the drive-in moment for the fitting piece into the drive means opening so that this cannot be done without the usage of a striking tool. The usage of the striking tool has the further risk that the connection element is damaged.

DE 202 05 314 U1 uses a closure element with thread for closing a drive means opening of the connection element. To this end, a thread matching the thread of the closure element is provided at the inner side of the drive means opening. Accordingly, the closure element is screwed into the drive means opening and fastened there. This solution has, however, the disadvantage that, in fact, a thread is compatible only with a small share of standardized drive means shapes.

According to DE 20 2010 001 752 U1, a sealing element is pressed into the drive means opening of the connection element by cold-forming. While the cold-forming ensures that the sealing material, here soft deformable metals or plastics, is adapted to the inner contour of the drive means opening, also an identifying embossing can be introduced into the upper side of the closure element. But this type of closure element requires the usage of a striking tool. Further, the amount of sealing material to be used has to be adjusted to the opening so that not excessively much material is displaced beyond the drive means opening at the upper side of the connection element. This is, however, at a manual adaption of the amount of the sealing material only possible in a limited manner. Because according to the here-described method, for example aluminum is used as sealing material and is cut-off from an aluminum round rod depending on the volume of the drive means opening to be closed. This proceeding has the further disadvantage that at an amount of sealing material which is too small, the drive means opening is either not sufficiently closed or the closure element is not held reliably in the drive means opening.

With respect to the above-discussed prior art, the object is thus to provide a structurally simply designed closure element which can also be introduced functionally into the drive means opening of the closure element by means of a simple method. At this, especially an efficient design of the installation method shall be in the foreground which provides the worker with a sufficient flexibility in his proceeding.

4. SUMMARY

The above object is solved by a closure element according to independent claim 1, an installation holding element according to independent claim 9 and a connection element according to independent claim 20. Advantageous embodiments of the present invention may result from the following description, the accompanying drawings and the appending claims.

The present disclosure relates first of all to a closure element of a drive means opening of a connection element which is engageable by a tool and by means of which the connection element is movable. The inventive closure element can be pressed into the drive means opening parallel to its longitudinal axis manually without tool and is fastenable therein solely by means of a frictional connection. The closure element has a shape which is defined by at least one element surface and/or at least one element edge as well as a closing or terminal surface, wherein a longitudinal axis of the closure element extends into the drive means opening in an insertion direction of the closure element and the at least one element surface and/or the at least one element edge are arranged parallel to the longitudinal axis of the closure element at least in a sub-area and the terminal surface is arranged almost perpendicular to the longitudinal axis of the closure element, wherein geometric protrusions are provided in a plurality of the parallel sub-areas of the at least one element surface and/or the at least one element edge which extend perpendicular to the longitudinal axis of the closure element, whereby the frictional connection of the closure element can be achieved and which define a geometric interference of the closure element with respect to dimensions of the drive means opening, wherein the geometric protrusions consist of a plurality of elevations and/or curvilinear holding webs or ribs and/or of non-perpendicular webs or ribs being oriented angularly with respect to the longitudinal axis and extending straightly.

At the construction of a closure element as simply constructed as possible, it has been seen that especially the element surfaces and/or element edges extending parallel to the insertion direction of the connection element and the closure element provide suitable abutment surfaces for a frictional connection between closure element and connection element. Because the element surfaces and element edges oriented in this way ensure an easy inserting of the closure element without the usage of striking tools. Further, it is not necessary to press the closure element into an increasing volume of the drive means opening in insertion direction or to deform it there. Instead, and in place of such an undercut resulting from the material deformation, a frictional connection between the element surfaces and/or element edges of the closure element and the oppositely arranged corresponding surfaces and/or edges of the drive means opening is produced. Possible intermediate spaces between opposing surfaces and edges are bridged by the geometric protrusions perpendicular to the insertion direction of the closure element and ensure a frictional connection between these oppositely arranged surfaces and edges. For facilitating an insertion of the closure element and for making a loosening more difficult, the geometric protrusions are adaptable in their dimension, shape and especially in their course with respect to the insertion direction. Thus, it is advantageous that these geometric protrusions are arranged at constructive stabilizing points between connection element and closure element for example as angularly extending holding webs or ribs or also as punctual elevations.

Preferred according to at least certain implementations of the invention, the geometric protrusions of the closure element have a geometric interference with respect to the dimensions of the drive means opening. According to a further preferred embodiment of the present invention, the closure element has a shape formed complementary with respect to the drive means opening, wherein the complementary shape is preferably adapted to a Torx, Phillips or crosshead or other standardized shapes of a drive means opening, preferably it corresponds to a shape of a drive means or tool engaging the drive means opening. For realizing an ideal adaption of the inventively preferred closure element to the drive means opening of connection elements, the closure elements are formed complementary to the drive means opening. As a result, the closure elements are formed or shaped corresponding to a tool tip, for example corresponding to a bit of an electric drill, by means of which the connection element is movable due to the engaging of the tool into the drive means opening. As such a tool provides a complementary shape with respect to the drive means opening, the closure element is adapted ideally to the volume of the drive means opening to be filled by adopting this shape. For ensuring a reliable seat of the closure element of the drive means opening, the above-described geometric protrusions realize a geometric interference at the shapes of the closure element which are formed complementary to the drive means opening so that the closure element is clamped in the respective drive means opening.

According to a further preferred embodiment of the present invention, the closure element consists of a thermoplastic, a duroplast, an elastomer or a hybrid with or without fiber-reinforcement. In this context, hybrid means that the component consists preferably of a material mix or of components of different materials. This material choice facilitates the pre-manufacturing of the closure elements to be inserted into the drive means opening. Accordingly, the closure elements are produced with their shape adapted to the drive means opening so that subsequently they just have to be pressed in. At this preferred manual pressing in of the closure element into the drive means opening, neither the usage of a striking tool is required nor the necessity of a material displacement within the drive means opening exists due to the adaption of the closure element. This proceeding facilitates altogether the closing of the drive means opening and reduces the timely effort for securing the connection element introduced in a component.

According to a further preferred embodiment, the at least one closure element, preferably a plurality of closure elements, is integrally and releasably fastened at an installation holding element in each case by means of a releasable holding web. With respect to this embodiment, the installation holding element serves for a simplified handling and thus insertion possibility of the closure element into the drive means opening.

The present disclosure relates also to an installation holding element by means of which a plurality of closure elements can be provided in each case to one drive means opening of a connection element and can be installed in the drive means opening of the connection element manually without tools, wherein the installation holding element comprises the following features: a holding element at which the plurality of closure elements, preferably a closure element according to the above-described construction alternatives, is integrally and releasably fastened, wherein the holding element comprises a handle portion by means of which an individual closure element can be installed without tool by means of a manual handling of the installation holding element in a receiving opening of a connection element and can be released from the holding element. Further preferred, the holding element comprises an areal or two-dimensional shape so that the areal shape provides a manual engagement or driving surface for moving, especially for rotating, the installation holding element.

Praxis has shown that the usage of individual closure elements for the inserting into a drive means opening is time consuming and impracticable. As a result, the inventive installation holding element has been developed which is preferably formed areally and comprises an all-round circumferential surface. At this circumferential surface, preferably equally spaced individual closure elements are arranged by means of holding webs or are releasably fastened at the holding element. Thus, the installation holding element provides on the one hand a magazine for the non-loose grouping of a plurality of closure elements. Further, the installation holding element ensures that a worker can grip individual closure elements conveniently by means of the holding element so that they can be inserted into the drive means opening and can subsequently be released from the holding element. As sufficient manual forces can be applied to the closure element by the worker due to the design of the holding element, a reliable inserting of the closure element into the drive means opening and a releasing of the closure element from the installation element are ensured. The preferred holding element ensures by means of its manual engagement or driving surface that the worker achieves a reliable torque for separating the closure element from the holding element due to the force to be applied manually.

According to a further preferred embodiment of the present invention, the closure element can be pressed into the drive means opening parallel to its longitudinal axis manually without tool and is fastened therein solely be means of a frictional connection. Thus, the installation method for the closure element can be summarized as follows: grabbing an installation holding element A having a handle portion for the manual handling and with a plurality of releasably fastened closure elements, preferably the above-described installation holding element, aligning a closure element with the drive means opening and inserting the closure element into the drive means opening by means of a linear movement without using a tool and moving the installation holding element relative to the inserted closure element and thereby loosening the closure element from the installation holding element. Further, it is preferred to press the closure element manually into the receiving opening and/or to rotate the installation holding element around a longitudinal axis of the closure element and relative to the closure element while the closure element is retained in the drive means opening. In this way, the web between closure element and holding element is interrupted and the closure element is released or loosened from the holding element. This releasing or loosening is preferably supported by means of a predetermined breaking point in the connecting web.

The present disclosure relates further to a production method for the installation holding element by means of an injection molding method. The production method comprises the following steps: providing an injection mold and/or press mold for an embodiment of the above-described installation holding element, injection molding of the installation holding element in the injection mold and/or press mold and demolding the installation holding element from the injection mold and/or press mold. In this context, it is preferred to provide a plurality of plastics for injection molding having different colors and/or to apply a coding at the terminal surface of the closure element for identifying a closure process with a closure element.

Furthermore, the disclosure relates to a connection element having a drive means opening, wherein a closure element according to one of the above described construction alternatives is installed in the drive means opening.

5. BRIEF DESCRIPTION OF THE ACCOMPANYING DRAWINGS

Certain preferred embodiments of the present invention are explained in detail with respect to the accompanying drawings. It shows.

6. DETAILED DESCRIPTION

Figure 1:
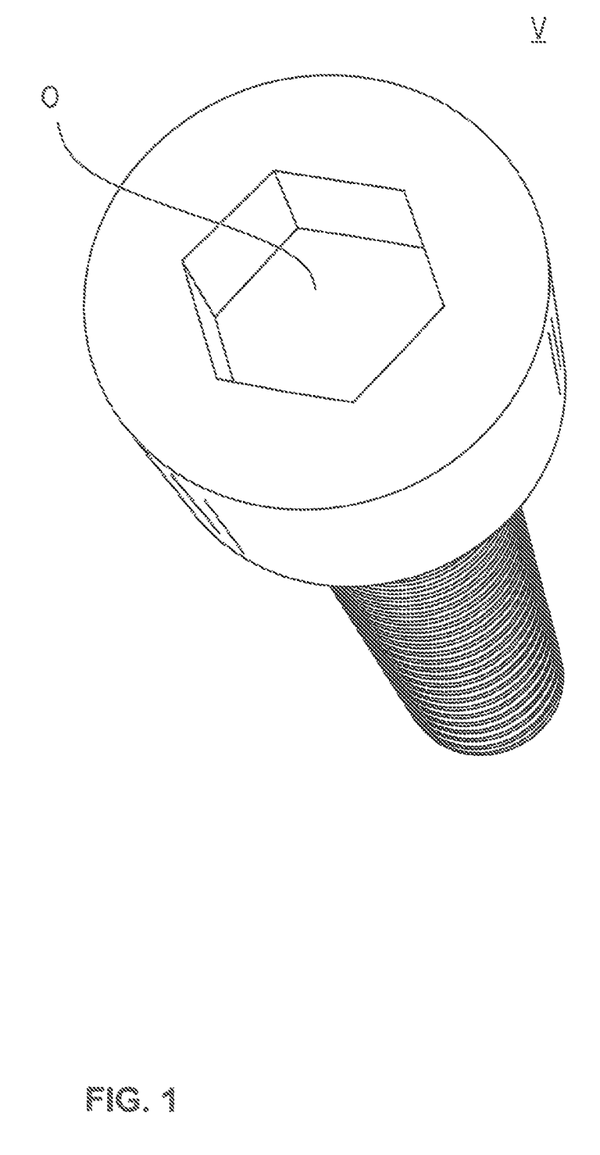
FIG. 1 a perspective view of a preferred connection element according to DIN 912 with a drive means opening in the shape of a hexagon socket, FIG. 2 a first preferred embodiment of the inventive installation holding element with closure element fastened thereto, FIG. 3 a further preferred embodiment of the installation holding element with a plurality of closure elements, FIG. 4 an enlarged perspective view of a preferred embodiment of a closure element, FIG. 5 an enlarged perspective view of a further embodiment of a closure element, FIG. 6*a* a further preferred embodiment of an installation holding element, FIG. 6*b* an enlarged depiction of the closure element of FIG. 6*a*, FIG. 7 a flow chart of a preferred embodiment of the inventive installation method, and FIG. 8 a flow chart of a preferred embodiment of the inventive production method.

In FIG. 1, a preferred connection element V having a drive means opening O is shown to which it is referred exemplarily for the different connection means with drive means opening. The drive means opening O has, according to the here-shown embodiment, a hexagon socket so that the connection element V can be rotated with the aid of an engaging hexagon key or wrench. The drive means opening O is preferably shaped in various ways. At least the engaging tip of the tool for installing the connection element V is adapted to the shape of the drive means opening O. Thus, the engaging tip of the tool is shaped complementary to the drive means opening. The shape or geometry of the drive means opening O and of the engaging tool (not shown) is preferably defined in official standards, here DIN 912, (see below) and in company-specific standards and known therefrom. For closing the drive means opening O, it is thus preferred to use a closure element 30; 30' (see below), the shape of which almost corresponds to the shape of the engaging tip of the known tool.

Figure 2:
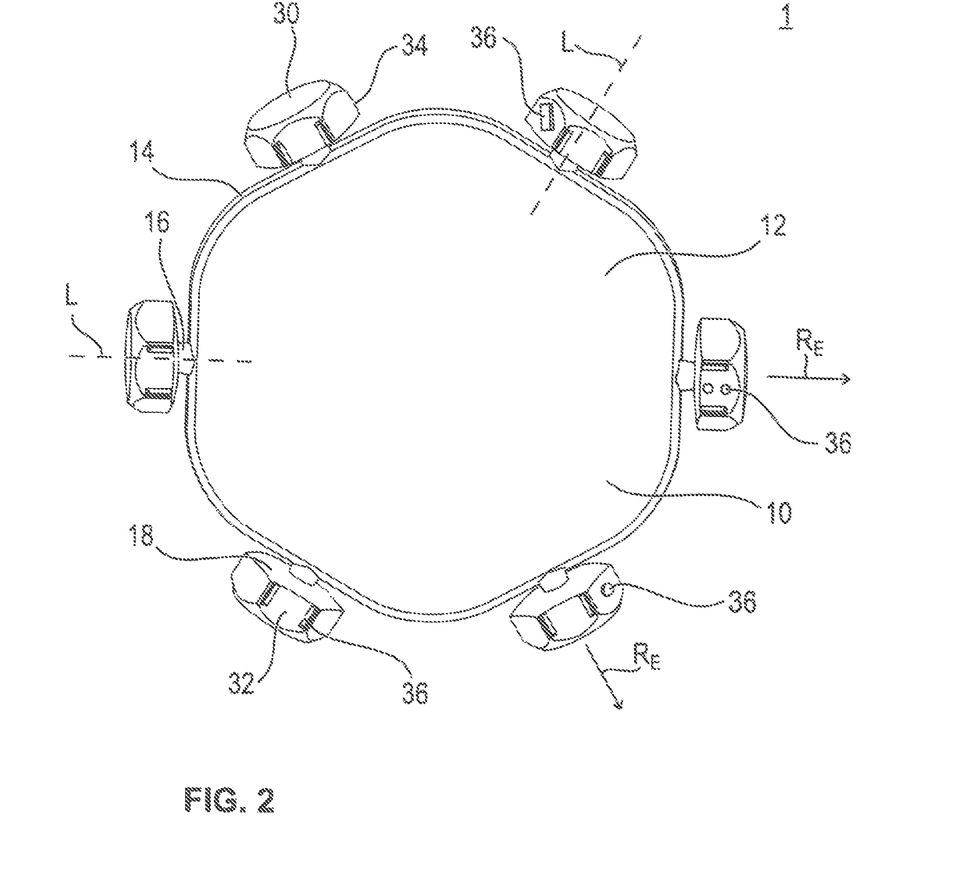
Figure 3:
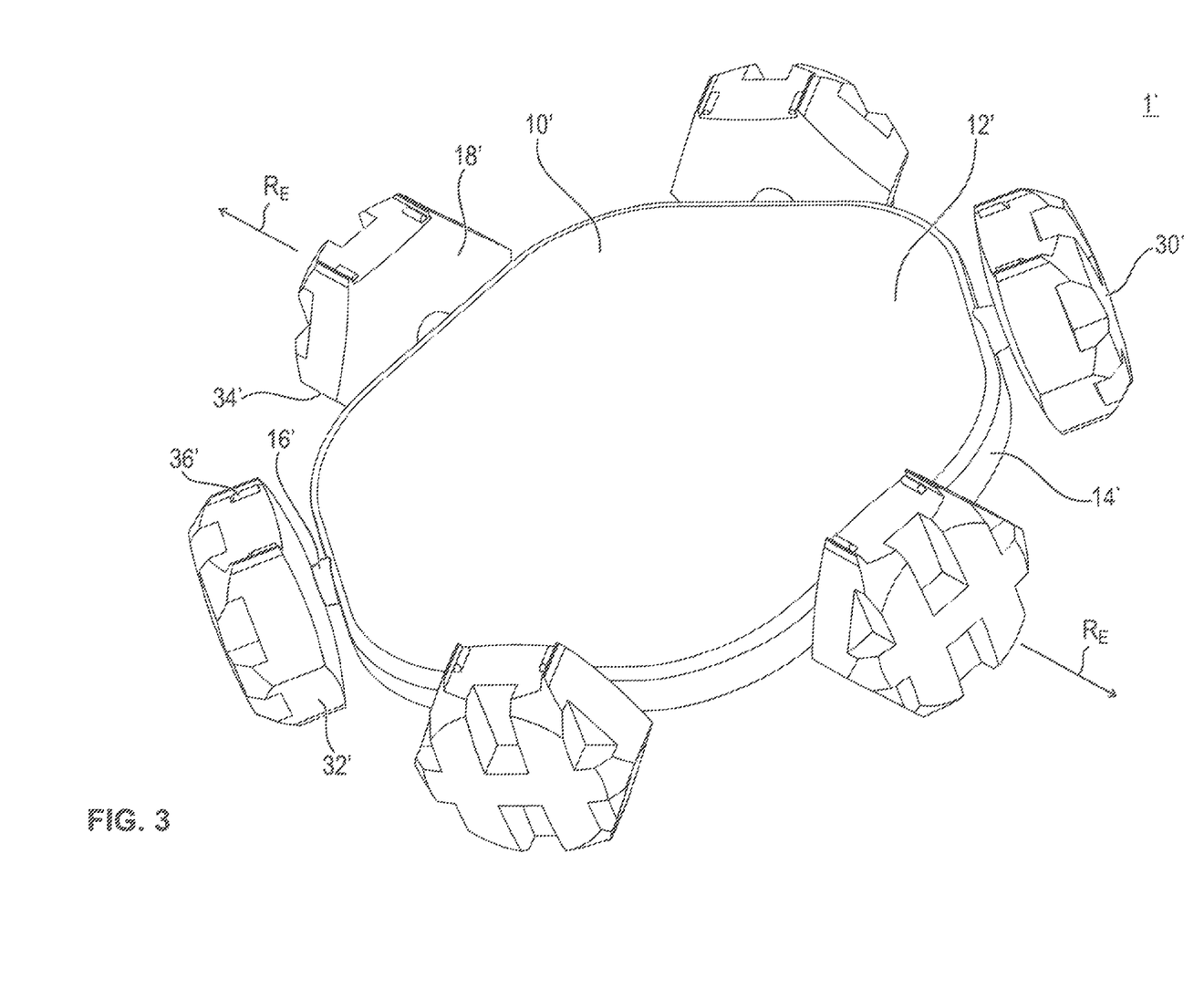

In FIGS. 2 and 3, two preferred embodiments of the installation holding element 1; 1' are shown in a perspective view, respectively. They comprise a central holding element 10; 10' which serves for the handling, storing and installing of a plurality of closure elements 30; 30'.

The holding element 10; 10' provides a handle portion 12; 12' so that a worker can hold the installation holding element 1; 1' reliably, can move it specifically and can apply the required installation forces to the closure elements 30; 30'. Thus, the holding element 10; 10' is preferably formed areally or two-dimensionally, wherein the shape of this surface is arbitrary. For providing a sufficient stability, the holding element 10; 10' has a specific thickness. This is in a range of about 1 to 6 mm, preferably 1.5 to 4 mm.

The above-mentioned thickness of the holding element leads to a circumferentially arranged all-round side surface 14; 14'. The side surface 14; 14' serves preferably for a releasable fastening of the plurality of closure elements 30; 30'. For this purpose, the closure elements 30; 30' are connected to the closure elements 30; 30' preferably by means of individual integral holding webs 16; 16'. The holding webs 16; 16' are connected integrally to the holding element 10; 10' and to the closure element 30; 30'. After installation of the closure element 30; 30' in a drive means opening (not shown) took place, the closure elements 30; 30' can be removed from the holding webs 16; 16' and thus also from the holding element 10; 10'. It is also preferred to fasten the closure elements 30; 30' in the handle portion 12; 12' by means of holding webs.

For being able to fasten a number of preferably three to twelve closure elements 30; 30' at the handle portion 12; 12', the handle portion 12; 12' has preferably a round or a polygonal or a rectangular or a triangular shape. The shape of the handle portion 12; 12' is chosen depending on the number of closure elements 30; 30' to be stored or to be fastened at the handle portion 12; 12'. At this, it is decisive that despite the storing of several closure elements 30; 30', each closure element 30; 30' is installable in a drive means opening (not shown) individually without mutual interference.

Preferably, the installation holding element 1; 1' consists of a thermoplastic, a duroplast, an elastomer or a hybrid with or without fiber-reinforcement. The choice of material ensures thus a sufficient elasticity of the closure elements 30; 30' so that the closure elements 30; 30' can be installed in the drive means opening in each case manually without the usage of a tool. In close correspondence with the choice of material, the constructive design of the closure elements 30; 30' takes place. Because upon installing of the closure elements 30; 30 in the drive means opening, geometric protrusions 20; 20' (see below) shall ensure a frictional bond and thus a tight seat of the closure element 30; 30' in the drive means opening. Thus, preferably only the geometric protrusions 20; 20' are deformed for producing the press-fit. Correspondingly, a material with relatively high stability can be chosen for the production of the closure elements 30; 30' as generally the geometric protrusions 20; 20' and their deformation is required for a reliable frictional connection, but not the deformation of the complete closure element 30; 30'. In this context, a specific choice of material for the installation holding element 1; 1' is PBT-GF-30 (polybutylene terephthalate having a glass fiber reinforcement of 30%), to name just one example It is also preferred to produce the installation holding element 1; 1' as hybrid component. While the holding element 10; 10' consists of a stable plastic for ensuring a sufficient stability during the installation method, the closure elements 30; 30' are produced from a material of higher elasticity. In the same way, it is conceivable to form the plurality of closure elements 30; 30' of different materials on the holding element 10; 10'. Correspondingly, and with this range of materials, different surrounding conditions as, for example, chemical loads could be taken into account. Further, it is preferred to provide closure elements 30; 30' of different size and/or different color composition at one holding element 10; 10'. In the same way, it is preferred to produce installation holding elements 1; 1' with only one size and one color of closure elements 30; 30'.

As it is shown based on the preferred embodiment of the installation holding element 1; 1' shown in FIG. 2 exemplarily for the general design of the closure elements 30; 30', the closure elements 30; 30' are shaped or formed similar to a tool engaging the standardized drive means opening, here an Allen key or hexagon key as hexagon socket force application. Thus, the closure element 30 fits into the drive means opening of a hexagon or Allen screw. Generally, connection elements, as for example screws, are provided with well-established shapes of drive means openings. They are standardized under different names or terms, as for example a drive means opening having a Torx, crosshead or Phillips, or Allen shape (hexagon socket). The exact geometry of the drive means openings and of the tool engaging in the drive means opening are defined in standards, like for example a DIN standard, and thus known. Among these DIN standards are, beside others, DIN 7985, DIN 7984, ISO 7380-2, ISO 4762, DIN 7991 and the like. Thus, from these standards, despite if they are official standards, like DIN standards, ASME standards or the like, or company-specific standards, the fitting geometries of the closure elements 30; 30', well actually of the drive tools filling the drive means opening, are known. Therefore, these standards are incorporated by reference for defining the geometries of the closure elements 30; 30' and the drive means opening.

As can be seen based on FIGS. 2 to 6, the closure element 30; 30' comprises a plurality of element surfaces 32; 32' and a plurality of element edges 34; 34'. They are preferably arranged oppositely to fitting surfaces and edges of the drive means opening as soon as the closure element 30; 30' has been inserted into the drive means opening.

As shown in FIGS. 2 and 3, the closure elements 30 are inserted into the drive means opening in an insertion direction $R_E$ parallel to their longitudinal axis L. For this, the worker grips the installation holding element 1; 1' without a tool manually by means of a central holding element 10 and moves the individual closure element 30; 30' into an oppositely arranged drive means opening. The movement is achieved solely by pressing the closure element 30; 30' into the drive means opening, without that tools or other auxiliary means are necessary for this purpose.

For achieving a reliable frictional connection between the closure element 30; 30' and the drive means opening or a press-fit in the drive means opening, geometric protrusions 36; 36' are provided at the closure element 30; 30' according to a preferred embodiment of the present invention. These geometric protrusions 36; 36' extend perpendicular to the longitudinal axis L of the closure element 30; 30', which is arranged parallel to the insertion direction $R_E$. Preferably, the geometric protrusions 36; 36' are arranged in subareas of the element surface 32 and/or the element edge 34, which extend or are arranged parallel to the longitudinal axis L of the closure element 30; 30'. The geometric protrusions 36; 36' are dimensioned such that they define a geometric interference for the closure element 30; 30' with respect to the receiving drive means opening. This means that due to the at least one geometric protrusion 36; 36', the closure element 30; 30' is dimensioned larger than the dimensions of the receiving drive means opening. Preferably, the geometric protrusions 36 are dimensioned such that they create an interference of the closure element 30;30' with respect to the drive means opening or with respect to the dimensions of the closure element 30 having no geometric protrusions 36 in the range of about 1 to 15%, preferably 2 to 8%. This interference is chosen depending on the material of the closure element 30. Thus, the interference is lower at a hard material compared to a soft material for achieving an ideal press-fit and the frictional connection of the closure element 30; 30' related thereto in the drive means opening. At more elastic materials for the closure element 30; 30', as for example silicone, which is preferably used in a stainless steel-screw in the food industry, also larger geometric interferences than the above-mentioned are preferred.

As can be seen based on the accompanying drawings, the geometric protrusions 36; 36' are arranged preferably adjacent to load removing element edges 34; 34' on the adjacent element surfaces 32; 32'. Further preferred, the geometric protrusions 36; 36' are arranged on the element edges 24. Due to their arrangement, the geometric protrusions 36; 36' have preferably a share of effect in longitudinal direction L of the closure element 30; 30'.

According to different preferred embodiments of the present invention, the geometric protrusions 36 are constructed as an elevation perpendicular to the longitudinal axis L and/or as curvilinear extending holding webs or ribs and/or as not perpendicular but angularly with respect to the longitudinal axis L orientated straightly extending holding webs or ribs which are elevated perpendicular to the longitudinal axis L. It is also preferred to combine elevations and holding webs with each other, as it is for example shown in FIG. 4.

Figure 4:
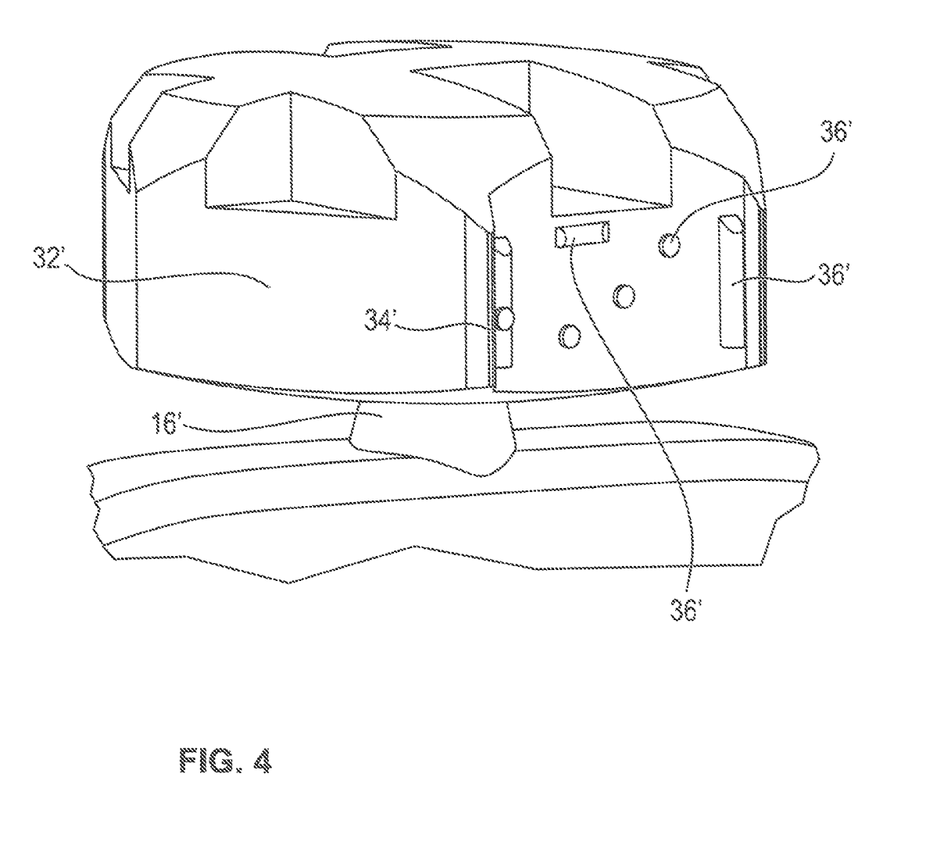
Figure 5:
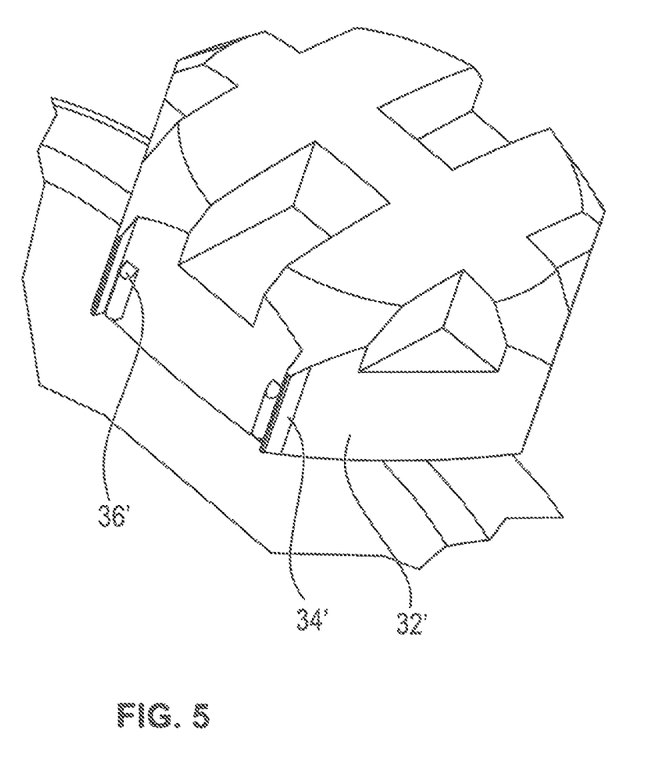
Figure 6A:
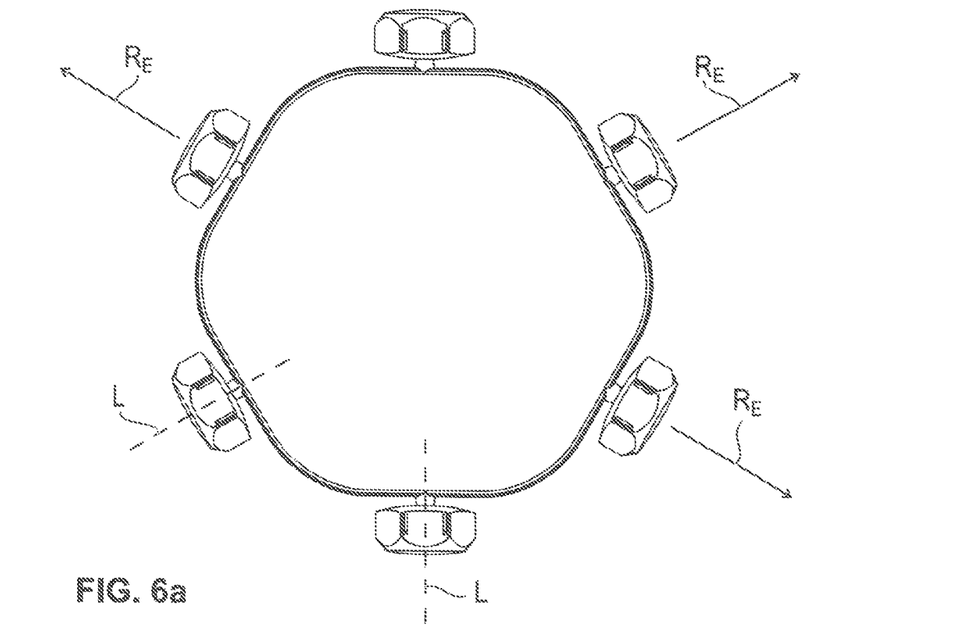
Figure 6B:
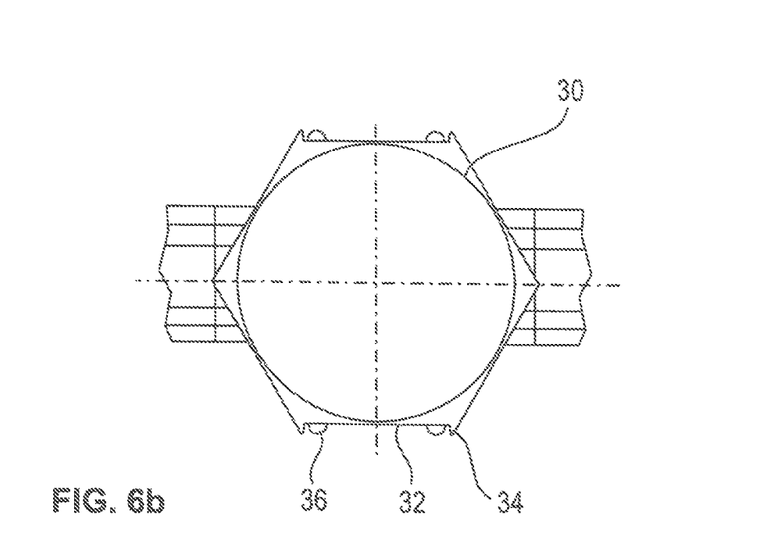

According to FIG. 6b, the geometric protrusions 36 preferably extend as linear holding webs parallel to the longitudinal axis L on the element surface 32 and in direct proximity to the element edge 34. FIG. 4 shows the arrangement of a plurality of elevations 36 on the element surface 32 or elevations on a holding web.

According to another preferred embodiment of the present invention, the interference of the closure element 30; 30' with respect to the drive means opening is not created by geometric holding webs 36 but by enlarged dimensions of the closure element 30; 30' itself. Thus, preferably the closure element 30 has a geometric interference with respect to the geometric dimensions of the standardized drive means openings in the already above defined range with respect to the geometric dimensions of the standardized drive means openings.

As can also be seen from the figures, the closure elements 30; 30' are connected to the holding element 10; 10' preferably by means of the individual holding webs 16; 16'. The holding webs 16; 16' end at a closure or terminal surface 18; 18' of the closure element 30; 30', which is preferably arranged perpendicular to the longitudinal axis L of the closure element 30; 30'. A perpendicular course of the terminal surface 18; 18' comprises that the terminal surface 18; 18' is waved, profiled, domed or similarly designed. Substantially, it forms the closure surface of the drive means opening, which is generally arranged perpendicular thereto like a closure of a receptacle.

Figure 7:
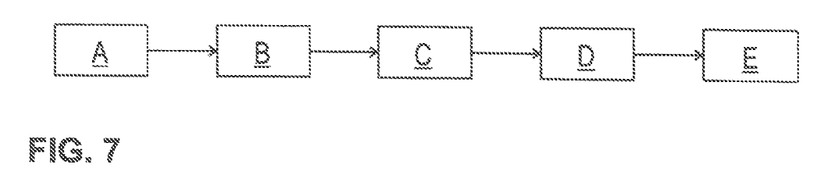

For installing the closure element 30; 30', in step A, the worker takes first of all the installation holding element 1; 1' into his hand by means of the handle portion 12; 12'. As the handle portion 12; 12' provides a sufficient engagement or driving surface for moving and for applying a specific installation force onto the closure element 30; 30', the worker is able to insert the closure element 30; 30' by means of the holding element 10; 10' into the drive means opening (step C). Prior to this, the worker aligns the closure element 30; 30' in its orientation with respect to the drive means opening manually so that the shape of the drive means opening and the closure element 30; 30' are aligned with respect to each other in a precisely fitting manner (step B). After the closure element 30; 30' has been reliably fastened in the drive means opening by a frictional connection, the worker separates the closure element 30; 30' from the holding element 10; 10' (step D). In this context, the holding web 16; 16' is preferably broken for separating the closure element. Thus, it is preferred to provide a predetermined breaking point in the holding web 16; 16' adjacent to the terminal surface 18; 18'. It is also preferred to separate the holding web 16; 16', and thus the holding element 10; 10', from the closure element 30; 30' by rotating the holding element 10; 10' with respect to the closure element 30; 30', which is arranged fixedly in the drive means opening. According to a further method alternative, the holding web 16; 16' is cut off from the closure element 30; 30'. Overall, it has to be emphasized with respect to the installation method that the installation method takes place without tool. The closure element 30; 30' is thus installed in the drive means opening solely by the forces applied by the worker and without a striking tool.

After a first closure element 30; 30' has been installed in the drive means opening and the closure element 30; 30' has been separated from the installation holding element 1; 1', a further closure element 30; 30', which is fastened at the installation holding element 1; 1', is aligned with a further drive means opening.

For this, preferably the installation holding element 1; 1' is rotated in the plane of the holding element 10; 10'. It is also preferred to rotate the installation holding element 1; 1' in arbitrary spatial directions for arranging a further closure element 30; 30' with respect to an empty drive means opening. Thereafter, the above-described installation method is repeated for arranging the closure element 30; 30' in the drive means opening.

Figure 8:
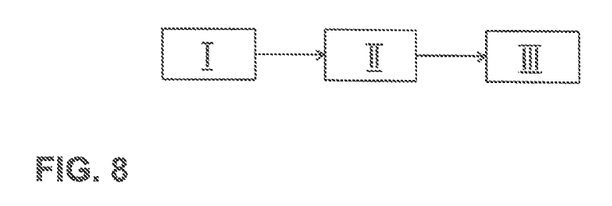

For producing the installation holding element 1; 1', first of all, in step I, an injection mold/press mold is provided, which is designed complementary to the installation holding element 1; 1'. Subsequently, in step II, the injection mold/press mold is filled with a desired plastic, thus the installation holding element 1; 1' is injection molded (step II). To this end, the plastic may contain a fiber-reinforcement or not. In the further step III, the installation holding element 1; 1' is demolded from the injection mold/press mold. Within the scope of the production method, it is also preferred to provide a plurality of plastics for injection molding. This preferably makes it possible to produce the installation holding element 1; 1' in different colors or also with different degrees of hardness of the plastic. A further preferred embodiment provides applying a coding onto the terminal surface 18; 18' of the closure element 30; 30'. Different colors of the installation holding elements 1; 1' and the closure elements 30; 30' connected thereto preferably serve for the allocation of the closure elements 30; 30' to an individual worker. Further, different colors emphasize, according to a further preferred embodiment, that a specific work process has been completed, for example the connection element has been tightened with a pre-defined torque. An above-mentioned coding of the terminal surface preferably serves alone or in combination with a specific color of the closure element 30; 30' for the identification of a closure process or a worker, the characterizing of a specific date of processing, the identification of a specific working department, company or the like.

7. LIST OF CERTAIN EMBODIMENTS FEATURES AND/OR COMBINATIONS OF FEATURES

1. A closure element (30; 30') of a drive means opening of a connection element which can be engaged by a tool and by means of which the connection element can be moved, wherein
   the closure element (30; 30') can be pressed into the drive means opening parallel to its longitudinal axis (L) manually without tool and is fastenable therein only be means of a frictional connection, wherein
   the closure element (30; 30') has a shape which is defined by at least one element surface (32; 32') and/or at least one element edge (34; 34') as well as one terminal surface (18; 18'), wherein a longitudinal axis (L) of the closure element (30; 30') extends into the drive means opening in an insertion direction ($R_E$) of the closure element (30; 30') and the at least one element surface (32; 32') and/or the at least one element edge (34; 34') are arranged at least in a subarea parallel to the longitudinal axis (L) of the closure element (30; 30') and the terminal surface (18; 18') is arranged almost perpendicular to the longitudinal axis (L) of the closure element (30; 30'), wherein in a plurality of the parallel subareas of the at least one element surface (32; 32') and/or of the at least one element edge (34; 34') geometric protrusions (36; 36') are provided which extend perpendicular to the longitudinal axis (L) of the closure element (30; 30'), whereby the frictional connection of the closure element (30; 30') can be achieved and which define a geometric interference of the closure element (30; 30') with respect to dimensions of the drive means opening, wherein the geometric protrusions (36; 36') consist of a plurality of elevations and/or curvilinear webs or ribs and/or of non-perpendicular webs or ribs being oriented angularly with respect to the longitudinal axis (L) and extending straightly.

2. Closure element (30; 30') according to embodiment 1, the geometric protrusions (36; 36') of which define a geometric interference of the closure element (30; 30') with respect to dimensions of the drive means opening.

3. Closure element (30; 30') according to embodiment 1 or 2, the closure element (30; 30') of which comprises a shape formed complementary to the drive means opening and the complementary shape is adapted to a Torx, a Phillips or crosshead, or other standardized shapes of a drive means opening, preferably it corresponds to a shape of a drive means or tool engaging the drive means opening.

4. Closure element (30; 30') according to one of the preceding embodiments which consists of a thermoplastic, a duroplast or elastomer with or without fiber-reinforcement.

5. Closure element (30; 30') according to one of the preceding embodiments which is integrally and releasably fastened at an installation holding element (1; 1') by means of a releasable web.

6. Installation holding element (1; 1') by means of which a plurality of closure elements (30; 30') can be provided to a drive means opening of a connection element and can be installed in the drive means opening of the connection element manually without tool, which comprises the following features:
   a. a holding element (10; 10'), at which the plurality of closure elements (30; 30'), preferably a closure element (30; 30') according to one of the embodiments 1 to 5, is fastened integrally and releasably, wherein
   b. the holding element (10; 10') comprises a handle portion (12; 12') by means of which an individual closure element (30; 30') is installable without tool by means of a manual handling of the installation holding element (1; 1') in a receiving opening of a connection element and is releasable from the holding element (10; 10').

7. Installation holding element (1; 1') according to embodiment 6, the holding element (10; 10') of which has an areal shape so that the areal shape provides a manual driving surface for moving, especially for rotating, the installation holding element (1; 1').

8. Installation holding element (1; 1') according to embodiment 6 or 7, in which the closure element (30; 30') can be pressed into the drive means opening parallel to its longitudinal axis (L) manually without tool and is fastenable therein only be means of a frictional connection, wherein
   the closure element (30; 30') comprises a shape which is defined by at least one element surface (32; 32') and/or at least one element edge (34; 34') as well as one terminal surface (18; 18'), wherein a longitudinal axis (L) of the closure element (30; 30') extends into the drive means opening in an insertion direction ($R_E$) of the closure element (30; 30') and the at least one element surface (32; 32') and/or the at least one element edge (34; 34') are arranged at least in a subarea parallel to the longitudinal axis (L) of the closure element (30; 30') and the terminal surface (18; 18') is arranged almost perpendicular to the longitudinal axis (L) of the closure element (30; 30'), wherein
   in a plurality of the parallel subareas of the at least one element surface (32; 32') and/or the at least one element edge (34; 34') geometric protrusions (36; 36') are provided, which extend perpendicular to the longitudinal axis (L) of the closure element (30; 30'), whereby the frictional connection of the closure element (30; 30') can be achieved, defining a geometric interference of the closure element (30; 30') with respect to dimensions of the drive means opening, wherein
   the geometric protrusions (36; 36') consist of a plurality of elevations and/or curvilinear webs or ribs and/or of non-perpendicular webs or ribs being oriented angularly with respect to the longitudinal axis (L) of the closure element (30; 30') and extending straightly.

9. Installation holding element (1; 1') according to one of the embodiments 6 to 8, the closure elements (30; 30') of which are connected to the holding element (10; 10') by means of a web, respectively, which can be interrupted manually 10. Installation holding element (1; 1') according to embodiment 7, wherein the holding element (10; 10') comprises a circumferential surface of a specific width and the plurality of closure elements (30; 30') is arranged equally distributed along the circumferential surface.

11. Installation holding element (1; 1') according to one of the embodiments 6 to 10, the holding element (10; 10') of which is formed polygonal and comprises a closure element (30; 30') at each polygonal side and/or edge.

12. An installation method for a closure element (30; 30') of a drive means opening of a connection element which comprises the following steps:
    a. grabbing (A) an installation holding element (1; 1') having a handle portion (12; 12') for the manual handling and with a plurality of releasably fastened closure elements (30; 30'), preferably the installation holding element (1; 1') according to one of the embodiments 6 to 11,
    b. aligning (B) a closure element (30; 30') with a drive means opening and inserting the closure element (30; 30') into the drive means opening by means of a linear movement without using a tool, and
    c. moving (D) the installation holding element (1; 1') relative to the inserted closure element (30; 30') and thereby releasing the closure element (30; 30') from the installation holding element (1; 1').

13. Installation method according to embodiment 12 which further comprises:
   pressing the closure element (30; 30') into the receiving opening manually.
14. Installation method according to embodiment 12 or 13 which furthermore comprises:
   rotating (E) the installation holding element (1; 1') around a longitudinal axis (L) of the closure element (30; 30') and relative to the closure element (30; 30') while the closure element (30; 30') is retained in the drive means opening.
15. Installation method according to one of the embodiments 12 to 14, comprising the further step: rotating (E) the installation holding element (1; 1') in a plane of a handle portion (12; 12'), and arranging a closure element (30; 30') in an installation position.
16. Production method for an installation holding element (1; 1') by means of an injection molding method which comprises the following features:
   a. providing (I) an injection mold and/or press mold for an installation holding element (1; 1') according to embodiment 6, and
   b. injection molding (II) the installation holding element (1; 1') in the injection mold and/or press mold, and
   c. demolding (III) the installation holding element (1; 1') from the injection mold and/or press mold.
17. Production method according to embodiment 16, comprising the further step:
   providing (I) a plurality of plastics for injection molding (II) having different colors and/or
   applying a coding on a terminal surface (18; 18') of the closure element (30; 30') for identifying a closure proceeding with a closure element (30; 30').

Certain embodiments or components or features of components have been noted herein as being "preferred" and such indications are to be understood as relating to a preference of the applicant at the time this application was filed. Such embodiments, components or features noted as being "preferred" are not required for implementation of the inventions disclosed herein unless otherwise indicated as being required, or unless specifically included within the claims that follow.

LIST OF REFERENCE SIGNS

1; 1' installation holding element
10; 10' holding element
12; 12' handle portion
14; 14' side surface
16; 16' holding web
18; 18' terminal surface
30; 30' closure element
32; 32' element surface
34; 34' element edge
36; 36' geometric protrusion
$R_E$ insertion direction
V connection element
O drive means opening
L longitudinal axis of the closure element
I providing an injection mold and/or press mold
II injection molding
III demolding
A receiving an installation holding element
B aligning a closure element
D moving the installation holding element
E rotating the installation holding element

The invention claimed is:

1. A closure element of a drive means opening of a connection element which can be engaged by a tool and by means of which the connection element can be moved, wherein
   the closure element can be pressed into the drive means opening parallel to its longitudinal axis manually without tool and is fastenable therein only by means of a frictional connection, wherein
   the closure element has a shape which is defined by at least one element surface and/or at least one element edge as well as one terminal surface, wherein a longitudinal axis of the closure element extends into the drive means opening in an insertion direction of the closure element and the at least one element surface and/or the at least one element edge are arranged at least in a subarea parallel to the longitudinal axis of the closure element and the terminal surface is arranged almost perpendicular to the longitudinal axis of the closure element, wherein
   in a plurality of the parallel subareas of the at least one element surface and of the at least one element edge geometric protrusions are provided which extend perpendicular to the longitudinal axis of the closure element, whereby the frictional connection of the closure element can be achieved and which define a geometric interference of the closure element with respect to dimensions of the drive means opening, wherein
   the geometric protrusions consist of a plurality of elevations and/or curvilinear webs or ribs and/or of non-perpendicular webs or ribs being oriented angularly with respect to the longitudinal axis and extending straightly.

2. Closure element according to claim 1, the geometric protrusions of which define a geometric interference of the closure element with respect to dimensions of the drive means opening.

3. Closure element according to claim 2, the closure element of which comprises a shape formed complementary to the drive means opening and the complementary shape is adapted to a Torx, a Phillips or crosshead, or other standardized shapes of a drive means opening, preferably it corresponds to a shape of a drive means or tool engaging the drive means opening.

4. Closure element according to claim 2 which consists of a thermoplastic, a duroplast or elastomer with or without fiber- reinforcement.

5. Closure element according to claim 2 which is integrally and releasably fastened at an installation holding element by means of a releasable web.

6. Closure element according to claim 1, the closure element of which comprises a shape formed complementary to the drive means opening and the complementary shape is adapted to a Torx, a Phillips or crosshead, or other standardized shapes of a drive means opening, preferably it corresponds to a shape of a drive means or tool engaging the drive means opening.

7. Closure element according to claim 1 which consists of a thermoplastic, a duroplast or elastomer with or without fiber-reinforcement.

8. Closure element according to claim 1 which is integrally and releasably fastened at an installation holding element by means of a releasable web.

9. Installation holding element by means of-which a plurality of closure elements can be provided to a drive means opening of a connection element and can be installed in the drive means opening of the connection element manually without tool, which comprises the following features:
- a. a holding element, at which the plurality of closure elements, preferably a closure element according to claim 1, is fastened integrally and releasably, wherein
- b. the holding element comprises a handle portion by means of which an individual closure element is installable without tool by means of a manual handling of the installation holding element in a receiving opening of a connection element and is releasable from the holding element.

10. Installation holding element according to claim 9, the holding element of which has an areal shape so that the areal shape provides a manual driving surface for moving, especially for rotating, the installation holding element.

11. Installation holding element according to claim 10, the closure elements of which are connected to the holding element by means of a web, respectively, which can be interrupted manually.

12. Installation holding element according to claim 10, wherein the holding element comprises a circumferential surface of a specific width and the plurality of closure elements is arranged equally distributed along the circumferential surface.

13. Installation holding element according to claim 10, the holding element of which is formed polygonal and comprises a closure element at each polygonal side and/or edge.

14. Installation holding element according to claim 9, in which the closure element can be pressed into the drive means opening parallel to its longitudinal axis manually without tool and is fastenable therein only by means of a frictional connection, wherein
  the closure element comprises a shape which is defined by at least one element surface and/or at least one element edge as well as one terminal surface, wherein a longitudinal axis of the closure element extends into the drive means opening in an insertion direction of the closure element and the at least one element surface and/or the at least one element edge are arranged at least in a subarea parallel to the longitudinal axis of the closure element and the terminal surface is arranged almost perpendicular to the longitudinal axis of the closure element, wherein
  in a plurality of the parallel subareas of the at least one element surface and/or the at least one element edge geometric protrusions are provided, which extend perpendicular to the longitudinal axis of the closure element, whereby the frictional connection of the closure element can be achieved, defining a geometric interference of the closure element with respect to dimensions of the drive means opening, wherein
  the geometric protrusions consist of a plurality of elevations and/or curvilinear webs or ribs and/or of non-perpendicular webs or ribs being oriented angularly with respect to the longitudinal axis of the closure element and extending straightly.

15. Installation holding element according to claim 14, the closure elements of which are connected to the holding element by means of a web, respectively, which can be interrupted manually.

16. Installation holding element according to claim 14, the holding element of which is formed polygonal and comprises a closure element at each polygonal side and/or edge.

17. Installation holding element according to claim 9, the closure elements of which are connected to the holding element by means of a web, respectively, which can be interrupted manually.

18. Installation holding element according to claim 17, the holding element of which is formed polygonal and comprises a closure element at each polygonal side and/or edge.

19. Installation holding element according to claim 9, the holding element of which is formed polygonal and comprises a closure element at each polygonal side and/or edge.

20. Connection element having a drive means opening, wherein a closure element according to claim 1 is installed in the drive means opening.

* * * * *